United States Patent
Devos et al.

(10) Patent No.: US 11,283,138 B2
(45) Date of Patent: Mar. 22, 2022

(54) CONNECTION MEMBER FOR CONNECTING TO A BUSBAR OF A BATTERY, BATTERY

(71) Applicant: Tyco Electronics Belgium EC BVBA, Oostkamp (BE)

(72) Inventors: Peter Devos, Beernem (BE); Henk Maes, Oostakker (BE)

(73) Assignee: Tyco Electronics Belgium EC BVBA, Oostkamp (BE)

( * ) Notice: Subject to any disclaimer, the term of this patent is extended or adjusted under 35 U.S.C. 154(b) by 193 days.

(21) Appl. No.: 16/513,977

(22) Filed: Jul. 17, 2019

(65) Prior Publication Data
US 2020/0028142 A1    Jan. 23, 2020

(30) Foreign Application Priority Data
Jul. 17, 2018  (EP) .................................... 8184005

(51) Int. Cl.
*H01M 50/502*  (2021.01)
*H01R 25/16*   (2006.01)

(52) U.S. Cl.
CPC ........ *H01M 50/502* (2021.01); *H01R 25/162* (2013.01)

(58) Field of Classification Search
CPC .......................... H01M 50/502; H01M 50/503; H01R 25/161; H01R 25/162
See application file for complete search history.

(56) References Cited

U.S. PATENT DOCUMENTS

| | | | |
|---|---|---|---|
| 8,114,540 B2 * | 2/2012 | Trester ................. | H01M 10/48 429/160 |
| 8,777,668 B2 * | 7/2014 | Ikeda ................... | H01M 50/20 439/627 |
| 9,865,372 B2 * | 1/2018 | Kroulik ............... | H01M 50/502 |
| 2010/0248029 A1 * | 9/2010 | Butt ..................... | H01M 50/20 429/211 |
| 2014/0003016 A1 * | 1/2014 | McCabe ............ | H01M 50/502 361/776 |
| 2015/0270666 A1 | 9/2015 | Callicoat et al. | |
| 2015/0380713 A1 * | 12/2015 | Kimura ............... | H01G 11/10 429/121 |
| 2017/0194071 A9 | 7/2017 | Kroulik et al. | |
| 2018/0097322 A1 * | 4/2018 | Harris, III .......... | H01M 50/502 |
| 2018/0277819 A1 * | 9/2018 | Kioschis ............. | H01M 10/48 |

FOREIGN PATENT DOCUMENTS

DE    10 2012 223 812 A1    6/2014

OTHER PUBLICATIONS

Extended European Search Report, Application No. 18184005.9, dated Oct. 17, 2018, 7 pages.
Abstract of DE 10 2012 223 812, dated Jun. 26, 2014, 1 page.

* cited by examiner

*Primary Examiner* — Renee S Luebke
*Assistant Examiner* — Paul D Baillargeon
(74) *Attorney, Agent, or Firm* — Barley Snyder (57) ABSTRACT

A connection member for connecting to a busbar of a battery includes a first section adapted to be connected to a battery cell, a second section adapted to be connected to the busbar attached to a support structure for the battery cell, and a pair of bends between the first section and the second section.

14 Claims, 12 Drawing Sheets

CONNECTION MEMBER FOR CONNECTING TO A BUSBAR OF A BATTERY, BATTERY

CROSS-REFERENCE TO RELATED APPLICATION

This application claims the benefit of the filing date under 35 U.S.C. § 119(a)-(d) of European Patent Application No. 18184005.9, filed on Jul. 17, 2018.

FIELD OF THE INVENTION

The present invention relates to a connection member and, more particularly, to a connection member for connecting to a busbar of a battery.

BACKGROUND

A connection member is used to connect a battery cell of the battery to a busbar attached to a support structure for the battery cell. Such batteries are, however, subjected to movements, leading to relative movement between the battery cell and the busbar. Relative movement between the battery cell and the busbar can result in a lost connection.

SUMMARY

A connection member for connecting to a busbar of a battery includes a first section adapted to be connected to a battery cell, a second section adapted to be connected to the busbar attached to a support structure for the battery cell, and a pair of bends between the first section and the second section.

BRIEF DESCRIPTION OF THE DRAWINGS

The invention will now be described by way of example with reference to the accompanying Figures, of which.

DETAILED DESCRIPTION OF THE EMBODIMENT(S)

Exemplary embodiments of the present disclosure will be described hereinafter in detail with reference to the attached drawings, wherein like reference numerals refer to like elements. The described embodiments are only possible configurations in which, however, the individual features as described herein can be provided independently of one another or can be omitted.

Figure 1:
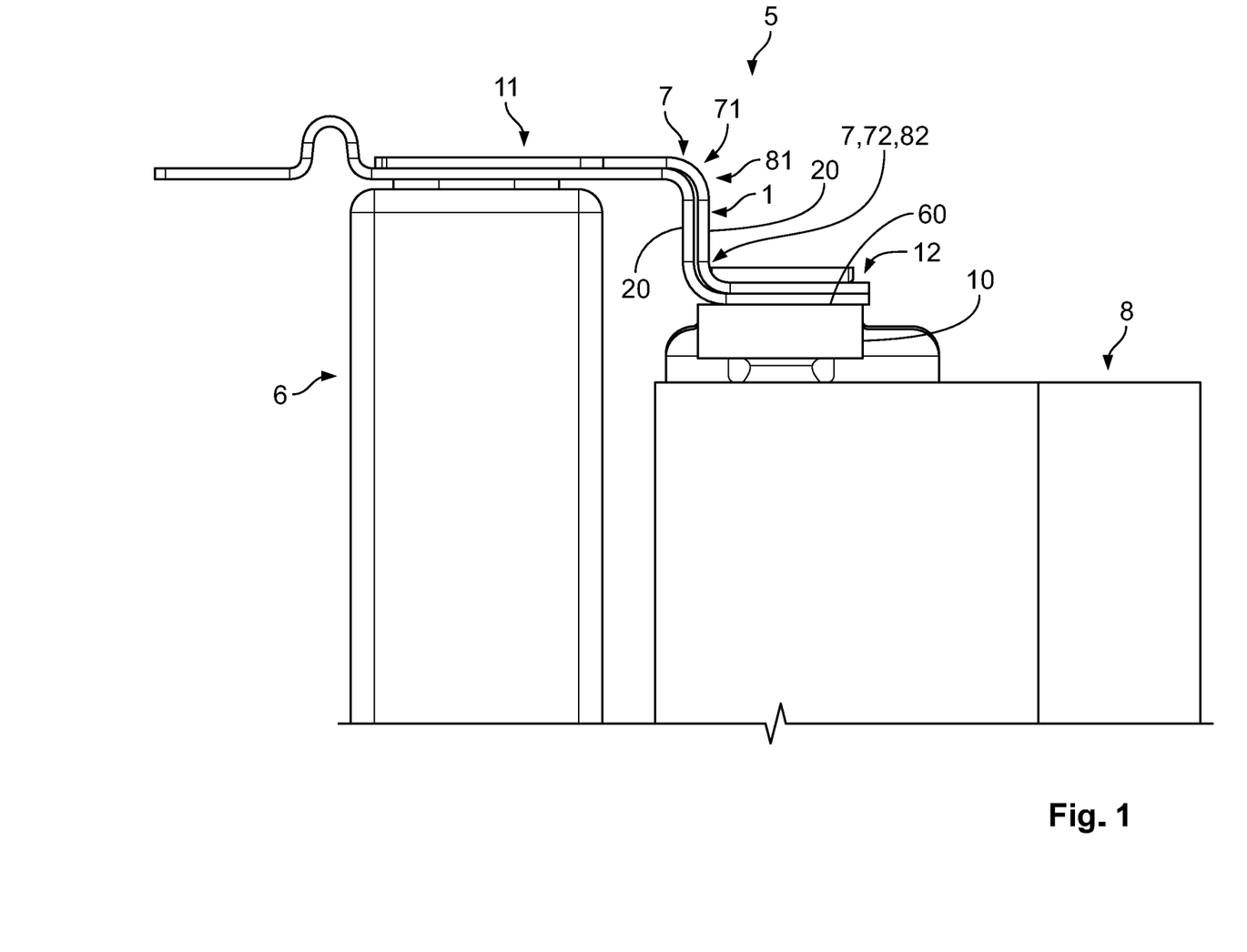
FIG. 1 is a side view of a connection member according to an embodiment on a battery.

A connection member 1 according to an embodiment, as shown in FIG. 1, is used for connecting a battery cell 6 of a battery 5 to a busbar 10 attached to a support structure 8 for the battery cell 6. The support structure 8 can provide mechanical support and stability for the battery 5. In an embodiment, the battery cell 6 is the last in a line of battery cells 6. The battery cell 6 must be connected electrically to the busbar 10.

The busbar 10 conducts the current and voltage accumulated from the battery cells 6. The busbar 10, as shown in FIG. 1, is attached to the support structure 8 that mechanically supports the battery cells 6. During certain operations, for example during the mounting of the busbar 10 or when an electric vehicle to which the battery 5 is attached moves, the battery cells 6 can move relatively to the support structure 8 and thus the busbar 10. Therefore, a certain movability between the battery cells 6 and the busbar 10 is necessary to maintain the electric connection between the battery cells 6 and the busbar 10.

To provide such flexibility, the connection member 1, as shown in FIG. 1, includes a first bend 7, 71 and a second bend 7, 72 that are located between a first section 11, at which the connection member 1 is connected to the battery cell 6, and a second section 12, where the connection member 1 is connected to the busbar 10. The curvature of the first bend 7, 71 is reverse or counter to the curvature of the second bend 7, 72. In the shown embodiment, the first bend 7, 71 is a right turn bend 81, while the second bend 7, 72 is a left turn bend 82. The connection member 1 thus has an S- or Z-shape.

Figure 2:
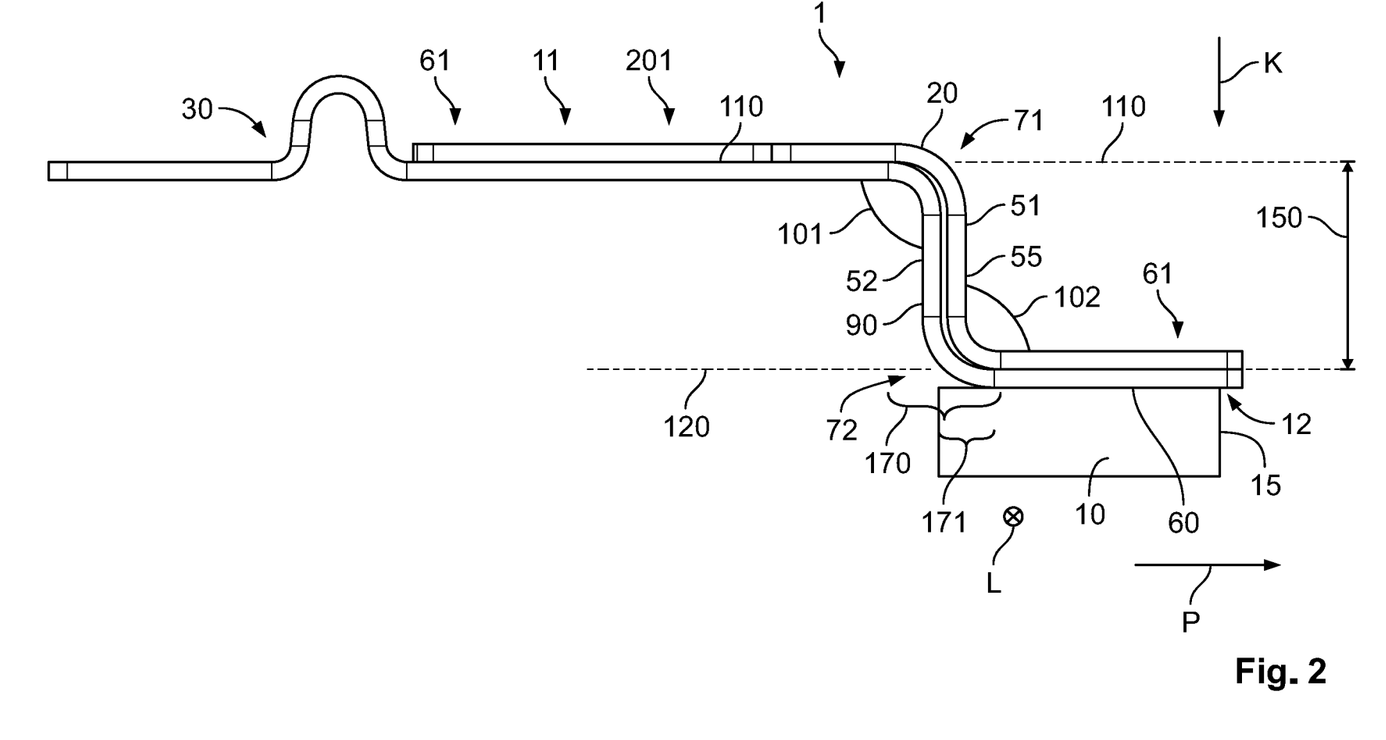
FIG. 2 is a side view of the connection member with a busbar.

In a relaxed state, as shown in FIG. 2, the first bend 7, 71 has an angle 101 of 90°. The second bend 7, 72 in this relaxed state also has an angle 102 of 90°. A first plane 110, which is defined by the first section 11, is parallel and spaced by a distance 150 to a second plane 120 defined by the second section 12. The first section 11 and the second section 12 can thus move relative to each other without big mechanical stresses on other sections 11, 12 and without losing electrical contact. In the shown embodiment, the second section 12 is located below the first section 11.

As shown FIG. 2, an intermediate section 90 between the first bend 7, 71 and the second bend 7, 72 includes two layers 50, 51, 52. Between the two layers 50, 51, 52, a gap 55 exists so that the two layers 50, 51, 52 are spaced from each other. In an embodiment, each of the layers 50, 51, 52 is made of a sheet metal. As a result, the connection member 1 has a higher flexibility compared to a configuration in which the intermediate section 90 is a single, thicker element. The intermediate section 90 is straight, in order to keep the production simple. The spacing between the two layers 50, 51, 52 also avoids friction between the two layers 50, 52, 51 which adds further flexibility. In order to maximize this flexibility, the two layer structure extends from the first section 11 to the second section 12. In this embodiment, the two layers 50, 51, 52 extend at least from the first section 11 to the second section 12.

Figure 3:
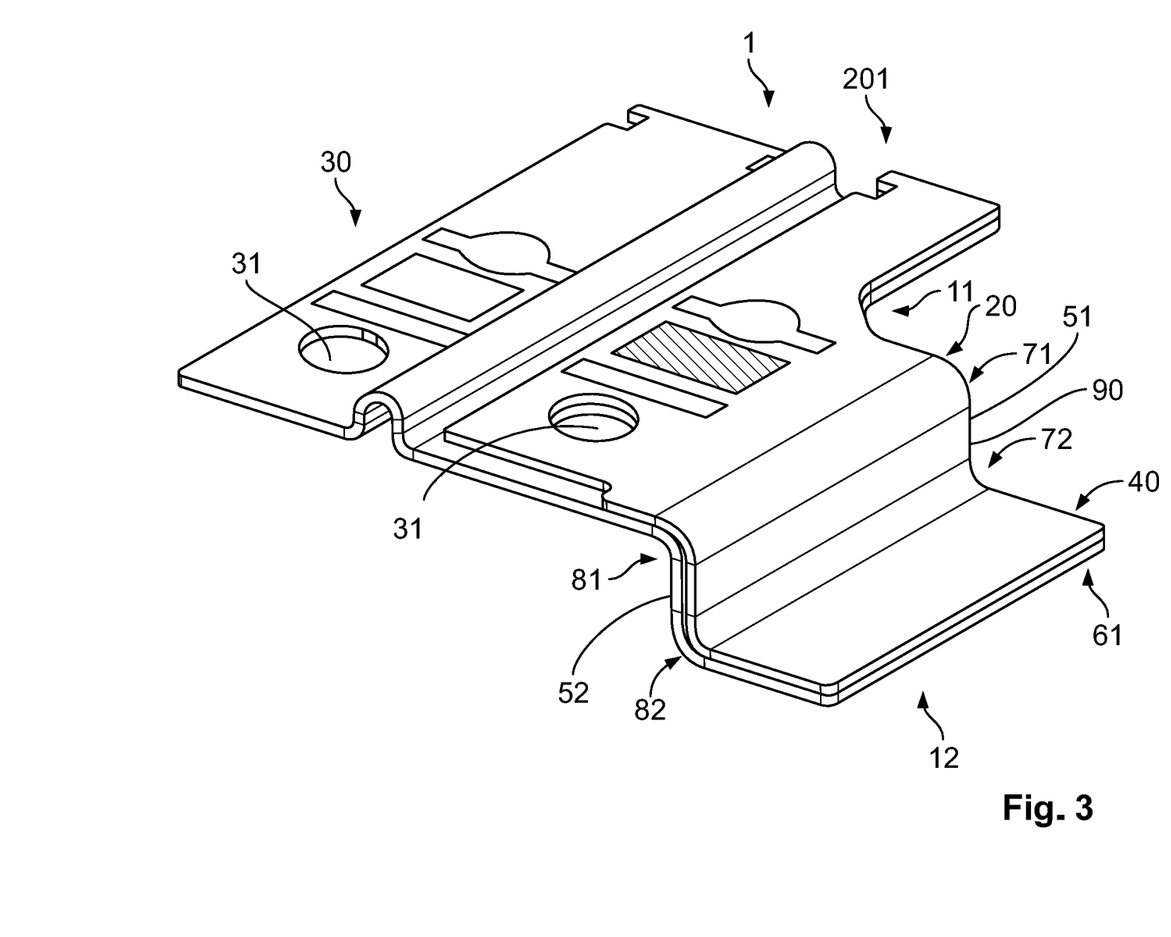
FIG. 3 is a perspective view of the connection member.

As shown in FIG. 2, the second section 12 is an end section 61 of the connection member 1. Both layers 50, 51, 52 terminate at the second section 12. The first layer 51 ends in the first section 11, but the second layer 52 extends further and forms part of a battery cell connector 30 which is used to connect two battery cells 31 to each other. For example, as shown in FIG. 3, holes 31 are present to allow a contacting of the pins of the electrodes of the battery cells 6.

Figure 4:
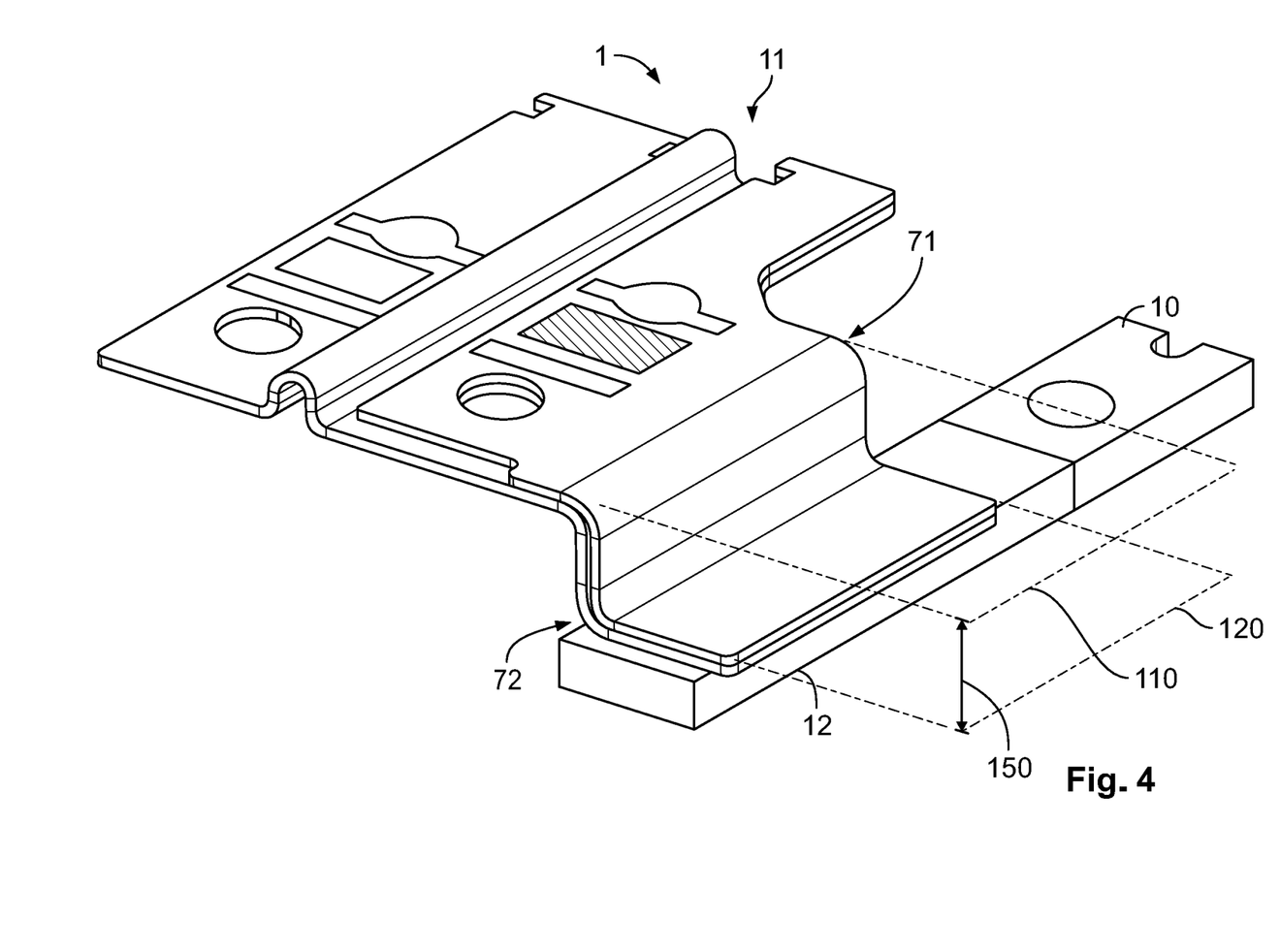
FIG. 4 is a perspective view of the connection member with the busbar.

As shown in FIG. 4, the second section 12 can be welded to the busbar 10. Due to the distance 150 between the two planes 110, 120, the busbar 10 can be straight and does not have to be bent upwards which would require a difficult manufacturing step.

Figure 5:
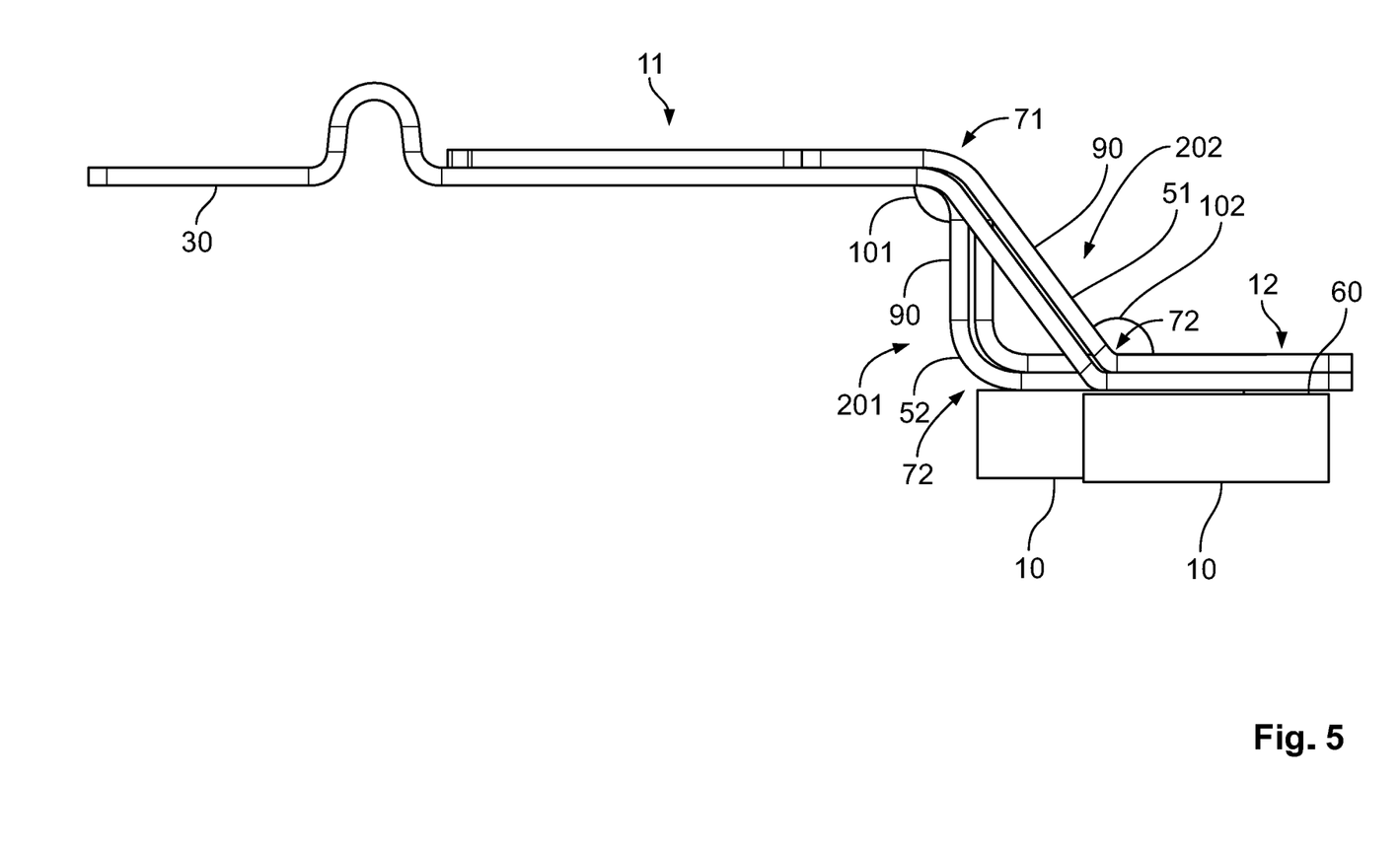
FIG. 5 is a side view of the connection member attached to the busbar in two different states.

Two states of the connection member 1 depicting an added flexibility are shown in FIG. 5. A first, relaxed state 201 corresponds to the state shown, for example, in FIG. 2. In a second state 202, force is applied to the battery cells 6 and/or the bus bar 10, so that a relative movement between the two is present and a distance between the two is greater than in the first, relaxed state 201. As a result, the first section 11 and the second section 12 also move relatively to each other and the connection member 1 is in a more straight configuration. The angles 101, 102 of the first bend 7, 71, 72 are now greater. The shown bending can be reversible so that the connection member 1 can go back to the configuration in FIG. 2.

Figure 6:
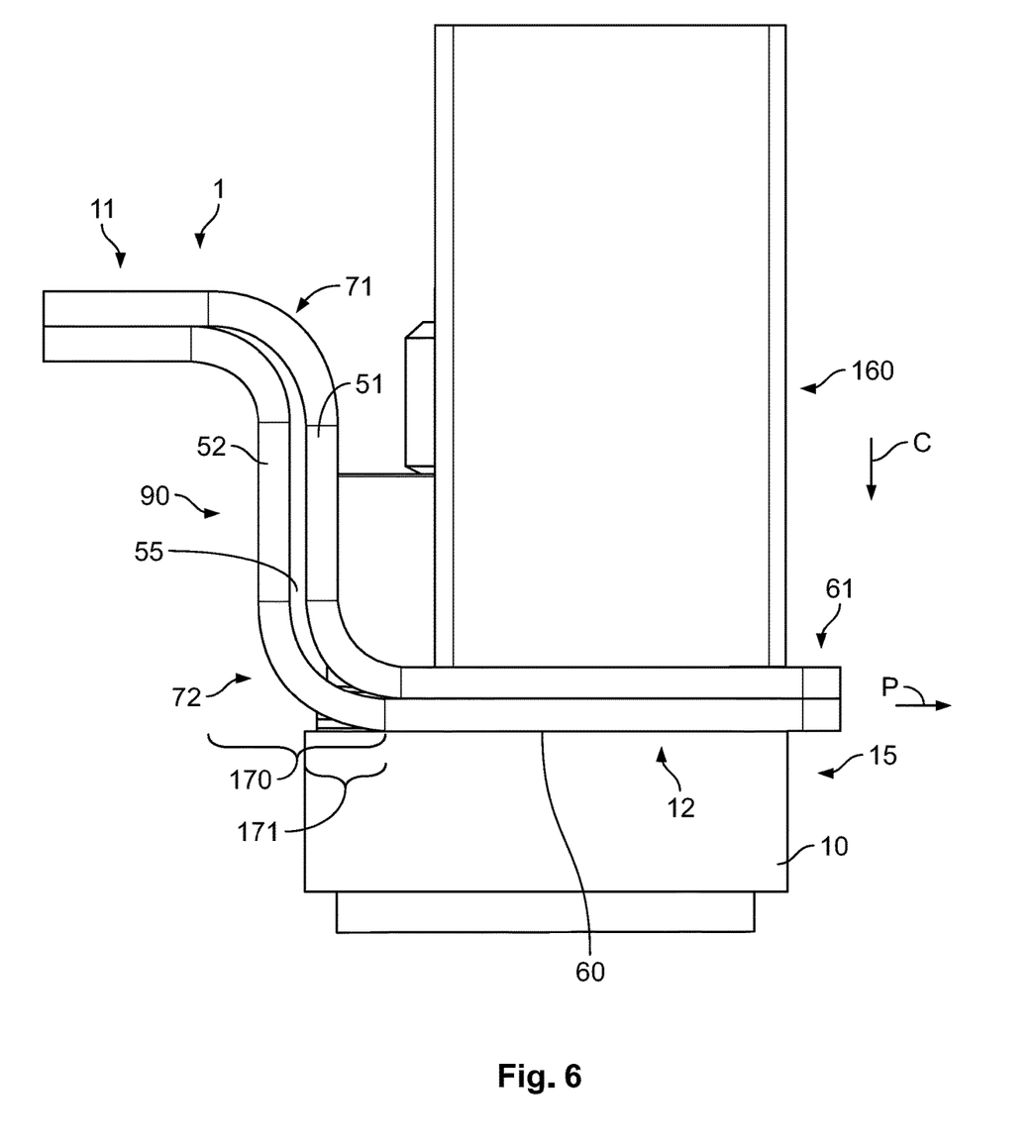
FIG. 6 is a side view of a contact area of the connection member attached to the busbar with a sonotrode.
Figure 7:
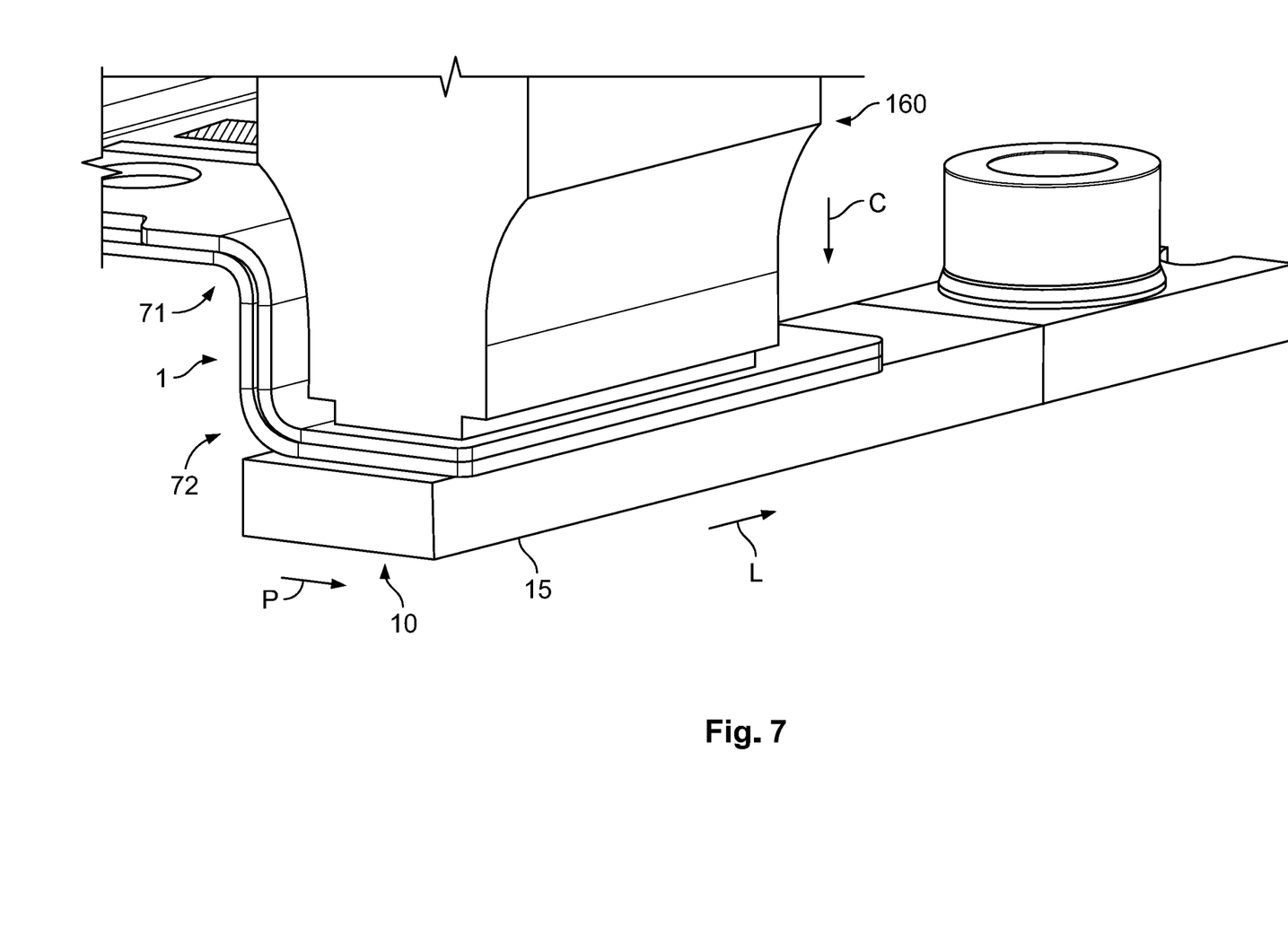
FIG. 7 is a perspective view of the contact area of the connection member attached to the busbar with the sonotrode.

In a welding process, as shown in FIGS. 6 and 7, the second section 12 is welded to a contact area 60 of the busbar 10. In an embodiment, the contact area 60 is a flat section of the busbar 10 and is planar. A sonotrode 160 pushes the second section 12 along a contacting direction C against the contact area 60. The application of ultrasound then results in a connection between the second section 12 and the busbar 10 at the contact area 60. As shown in FIG. 6, the connection member 1 is located above the contact area 60 in such a way that at least a part 171 of the projection 170 of the bends 7, 71, 72 is located in the contact area 60. This saves space in a perpendicular direction P that is perpendicular to the contacting direction C and a longitudinal direction L in which the bus bar 10 extends. Similarly, the first section 11 can be attached to the battery cell 6, for example by welding.

As shown in FIG. 6, the end section 61 can be positioned over the busbar 10 leaving more space for the ultrasonic welding. The welding sonotrode 160 can be positioned in a projection at the border of the busbar 10 while the overlap keeps the sealing properties unaffected. The end section 61, here the second section 12, projects beyond a side face 15 of the busbar 10.

Figure 8:
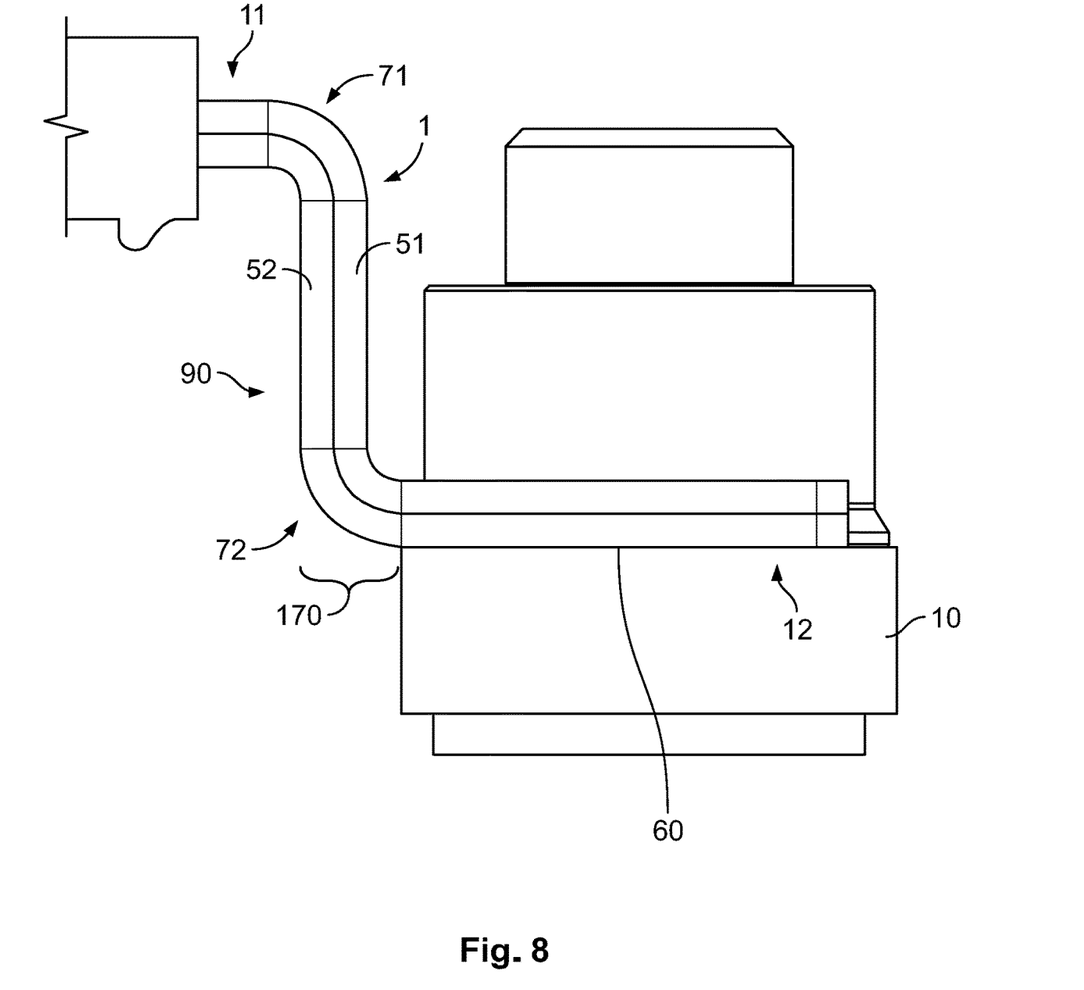
FIG. 8 is a side view of a connection member attached to the busbar according to another embodiment.

In another embodiment shown in FIG. 8, the two bends 7, 71, 72 are not located above the contact area 60 of the busbar 10 and thus a projection 170 of the two bend 7, 71, 72 is not located over the contact area 60. Such an embodiment can be easier to produce.

Figure 9:
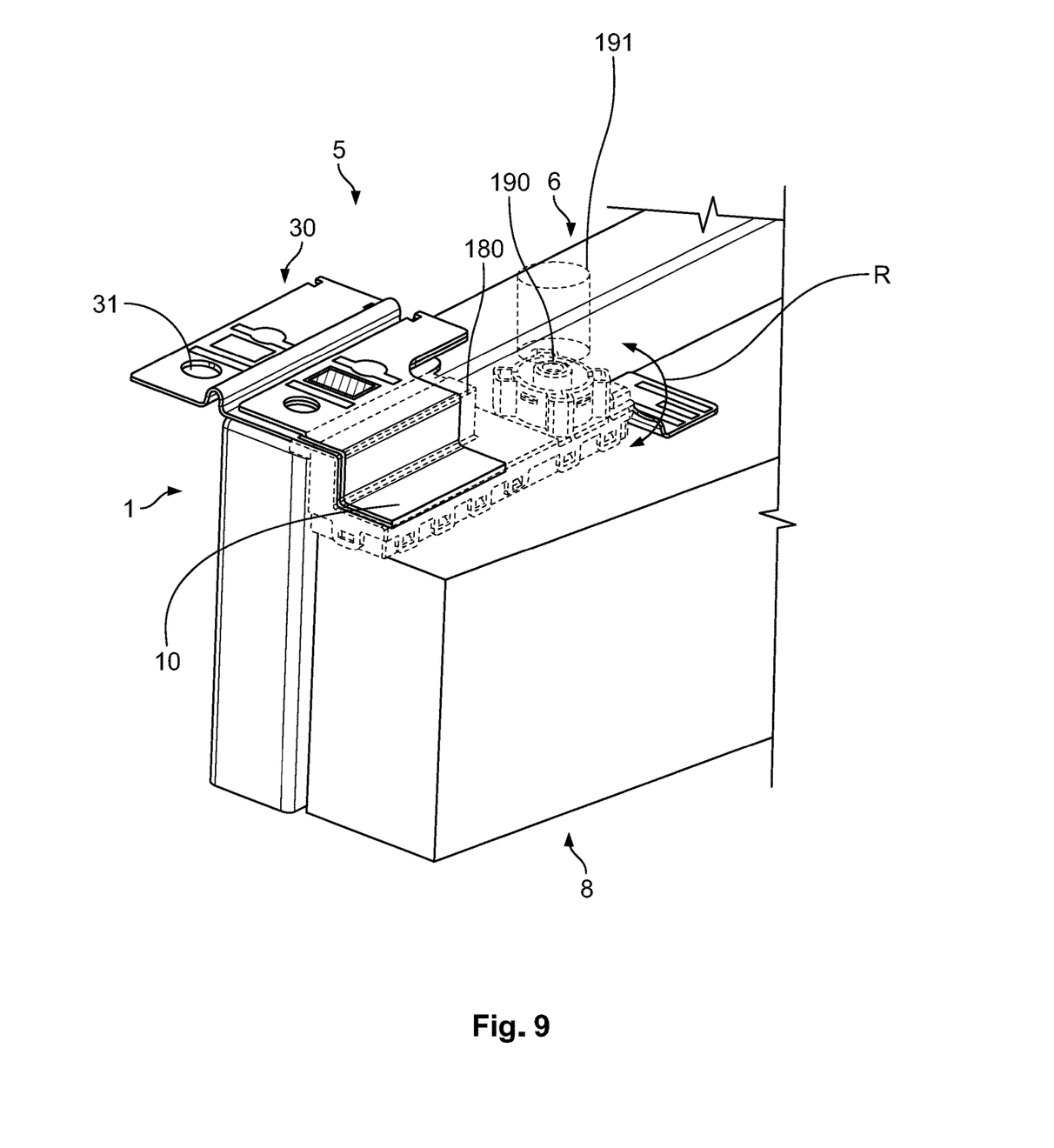
FIG. 9 is a perspective view of the connection member of FIG. 1 with the battery, a cover, and a tool.
Figure 10:
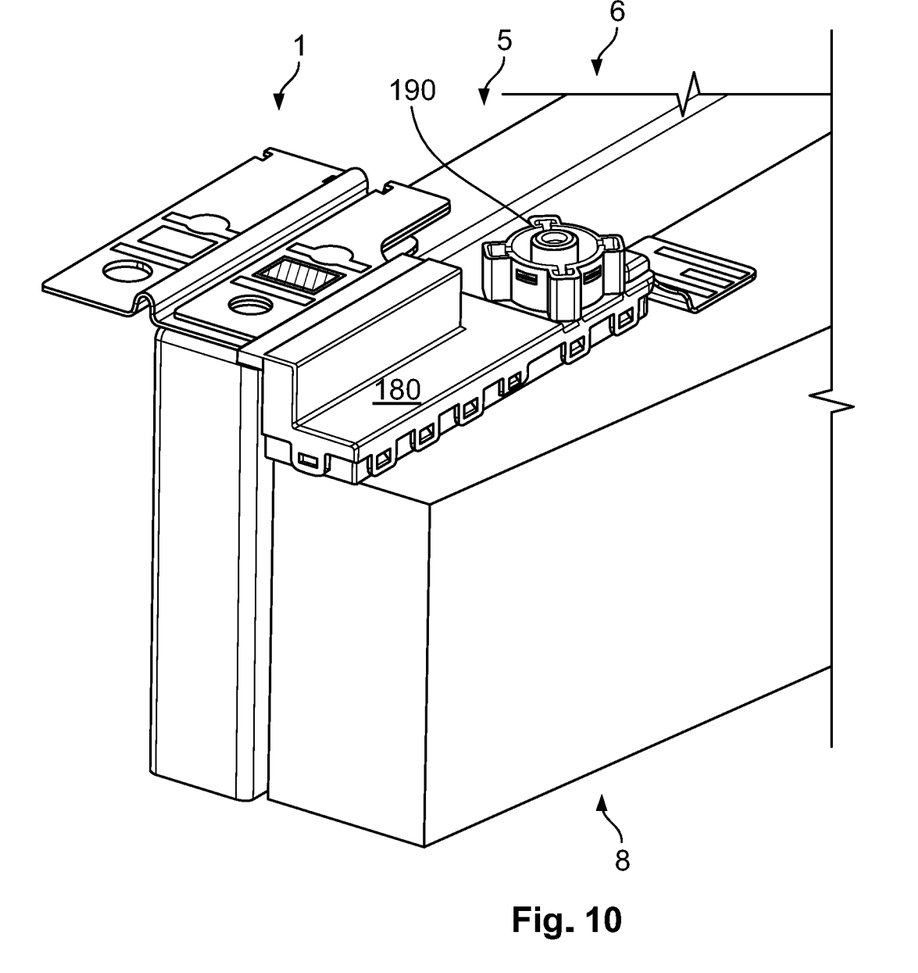
FIG. 10 is a perspective view of the connection member of FIG. 1 with the battery and the cover.

The connection member 1 is shown attached to the battery cell 6 in FIGS. 9 and 10. In FIG. 9, a cover 180 is shown transparent. Further, a tool 191 for fixing a fixing element 190, for example a screw, is shown schematically. When the tool 191 is operated by rotating, a force is applied to the connection member 1. This force has little effect on the connection between the battery cell 6 and the busbar 10, as the connection member 1 allows for a movement between the two.

Figure 11:
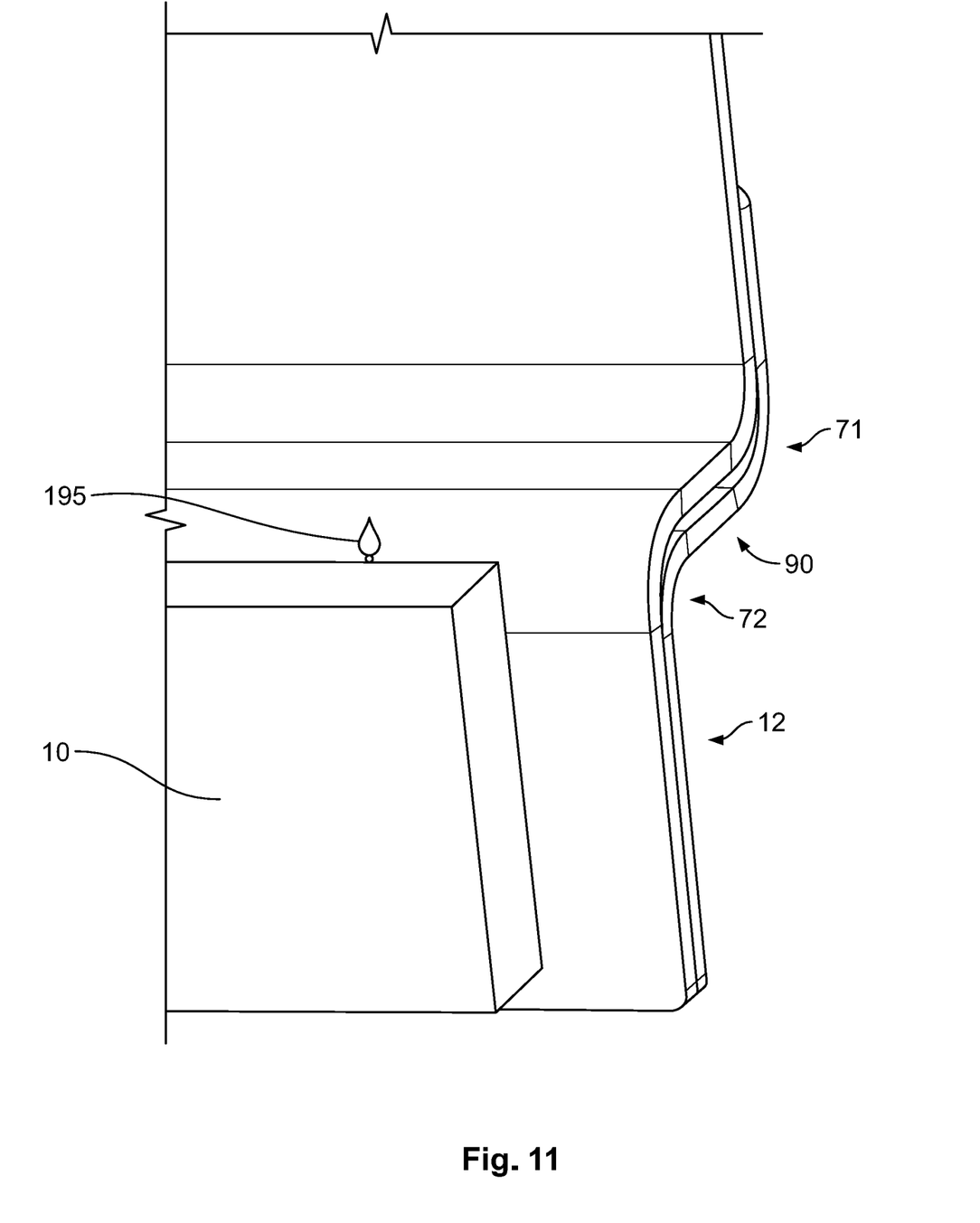
FIG. 11 is a perspective view of the connection member of FIG. 1 with a sealing material.
Figure 12:
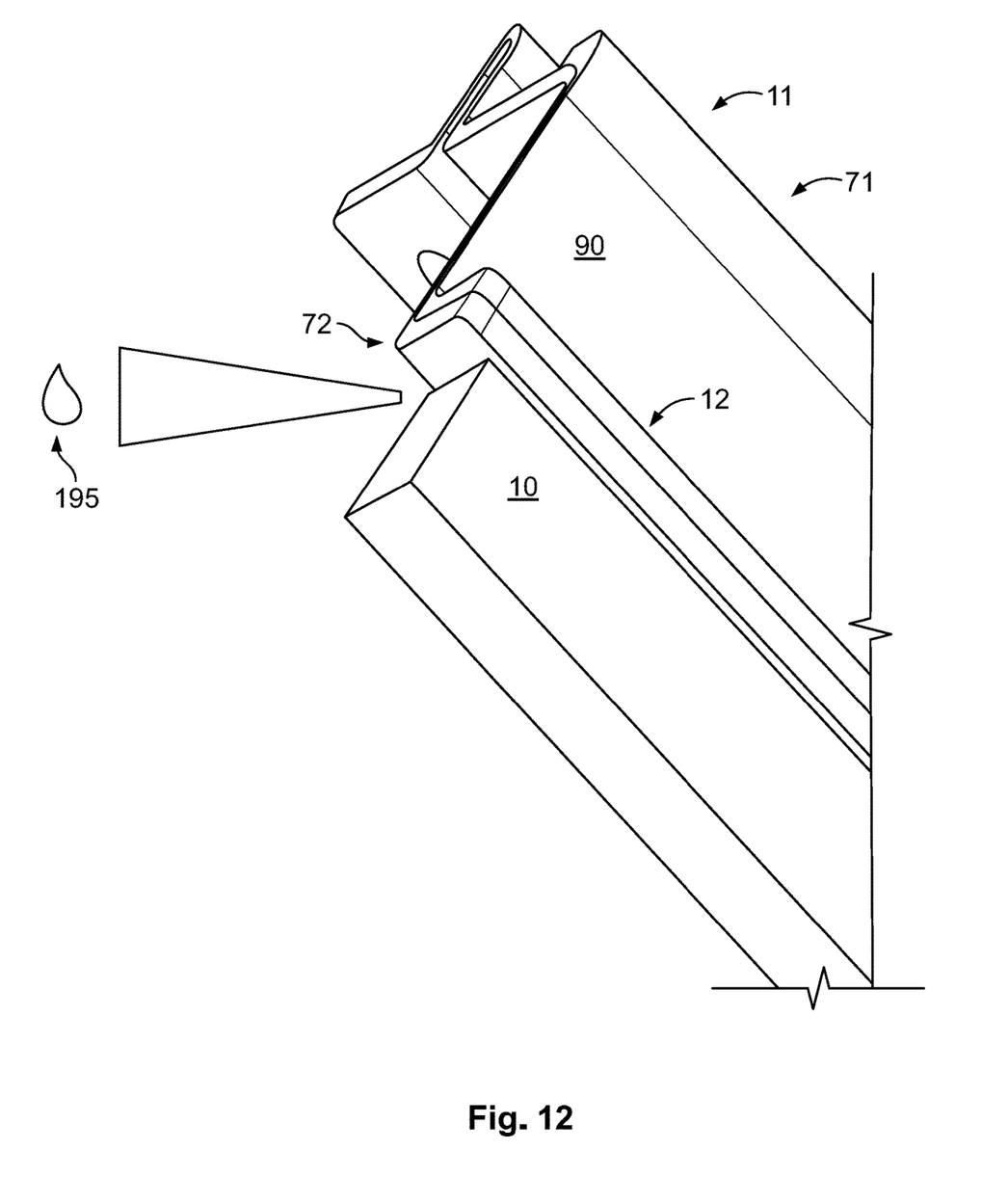
FIG. 12 is a perspective view of the connection member of FIG. 1 with the sealing material.

As shown in FIGS. 11 and 12, a sealing material 195 can be applied, for example at a funnel-like section between the bus bar 10 and the second section 12.

What is claimed is:

1. A connection member for connecting to a busbar of a battery, comprising:
   a first section adapted to be connected to a battery cell;
   a second section adapted to be connected to the busbar attached to a support structure for the battery cell;
   a pair of bends between the first section and the second section; and
   an intermediate section between the pair of bends including a pair of layers, a first layer of the pair of layers is spaced from a second layer of the pair of layers in the intermediate section, the pair of layers extend from the first section to the second section, the first layer abuts the second layer in the first section and/or in the second section.

2. The connection member of claim 1, wherein a curvature of a first bend of the pair of bends is reverse to a curvature of a second bend of the pair of bends.

3. The connection member of claim 1, wherein a plane of the first section is parallel to and spaced from a plane of the second section.

4. The connection member of claim 3, wherein the plane of the first section is spaced from the plane of the second section by a distance extending in a direction perpendicular to the plane of the first section and the plane of the second section.

5. The connection member of claim 1, wherein the intermediate section is straight.

6. The connection member of claim 1, wherein the pair of layers are each a sheet metal layer.

7. The connection member of claim 1, wherein at least one of the layers forms a battery cell connector adapted to connect a pair of battery cells.

8. The connection member of claim 1, wherein the second section is adapted to be welded to the busbar of the support structure.

9. The connection member of claim 1, wherein the first section is an end section of the connection member.

10. The connection member of claim 1, wherein the second section is an end section of the connection member.

11. The connection member of claim 1, wherein a gap is formed between the first layer and the second layer in the intermediate section.

12. A battery, comprising:
    a battery cell;
    a busbar attached to a support structure for the battery cell; and
    a connection member including a first section adapted to be connected to the battery cell, a second section adapted to be connected to the busbar, a pair of bends between the first section and the second section, and an intermediate section between the pair of bends including a pair of layers, a first layer of the pair of layers is spaced from a second layer of the pair of layers in the intermediate section, the pair of layers extend from the first section to the second section, the first layer abuts the second layer in the first section and/or in the second section.

13. The battery of claim 12, wherein a projection of one of the bends onto the busbar is at least partially located in a contact area of the busbar.

14. The battery of claim 12, wherein the busbar is straight.

* * * * *